United States Patent [19]

Maloblocki

[11] Patent Number: 4,501,292

[45] Date of Patent: Feb. 26, 1985

[54] BALL-TYPE CHECK VALVE

[75] Inventor: Richard Maloblocki, Hinsdale, Ill.

[73] Assignee: Ametc Development Company, Highland Park, Ill.

[21] Appl. No.: 366,600

[22] Filed: Apr. 8, 1982

[51] Int. Cl.³ ............................................. F16K 15/04
[52] U.S. Cl. ................................ 137/533.11; 251/368
[58] Field of Search ...................... 137/533.11, 533.13, 137/533.15, 519.5

[56] References Cited

U.S. PATENT DOCUMENTS

| 203,590 | 5/1878 | Colborne . | |
|---|---|---|---|
| 398,111 | 2/1889 | Abbot et al. . | |
| 708,529 | 9/1902 | Camentz, Jr. . | |
| 1,093,871 | 4/1914 | McIntyre . | |
| 1,326,321 | 12/1919 | Callahan . | |
| 1,700,234 | 1/1929 | McCrosky | 137/533.11 |
| 2,192,541 | 3/1940 | Davis . | |
| 3,994,082 | 11/1976 | Faldi . | |
| 4,069,840 | 1/1978 | Brown | 137/533.11 |
| 4,129,144 | 12/1978 | Andersson . | |
| 4,140,437 | 2/1979 | Faldi . | |

FOREIGN PATENT DOCUMENTS

| 1057840 | 5/1959 | Fed. Rep. of Germany | 137/533.11 |
|---|---|---|---|
| 2351333 | 12/1977 | France | 137/533.11 |
| 12475 | of 1887 | United Kingdom | 137/519.5 |

OTHER PUBLICATIONS

Brochure, "Flomatic Type 50 Ball Check Valve".

*Primary Examiner*—Robert G. Nilson
*Attorney, Agent, or Firm*—Todd S. Parkhurst

[57] ABSTRACT

A ball-check type check valve is disclosed. A valve housing comprises a first vertically disposed cylindrical section and a second section which extends diagonally upwardly and away from the first section. A third housing section extends away from the second section at a lesser horizontal angle. When a fluid is caused to flow upward through the first housing section, the ball moves out of the first section, along the second section, and is held in an unstable condition in and on the third valve section. When fluid flow halts and pressure against the ball ceases, the ball rolls out of the third section, back down the second section, and into sealing engagement with the first section.

11 Claims, 3 Drawing Figures

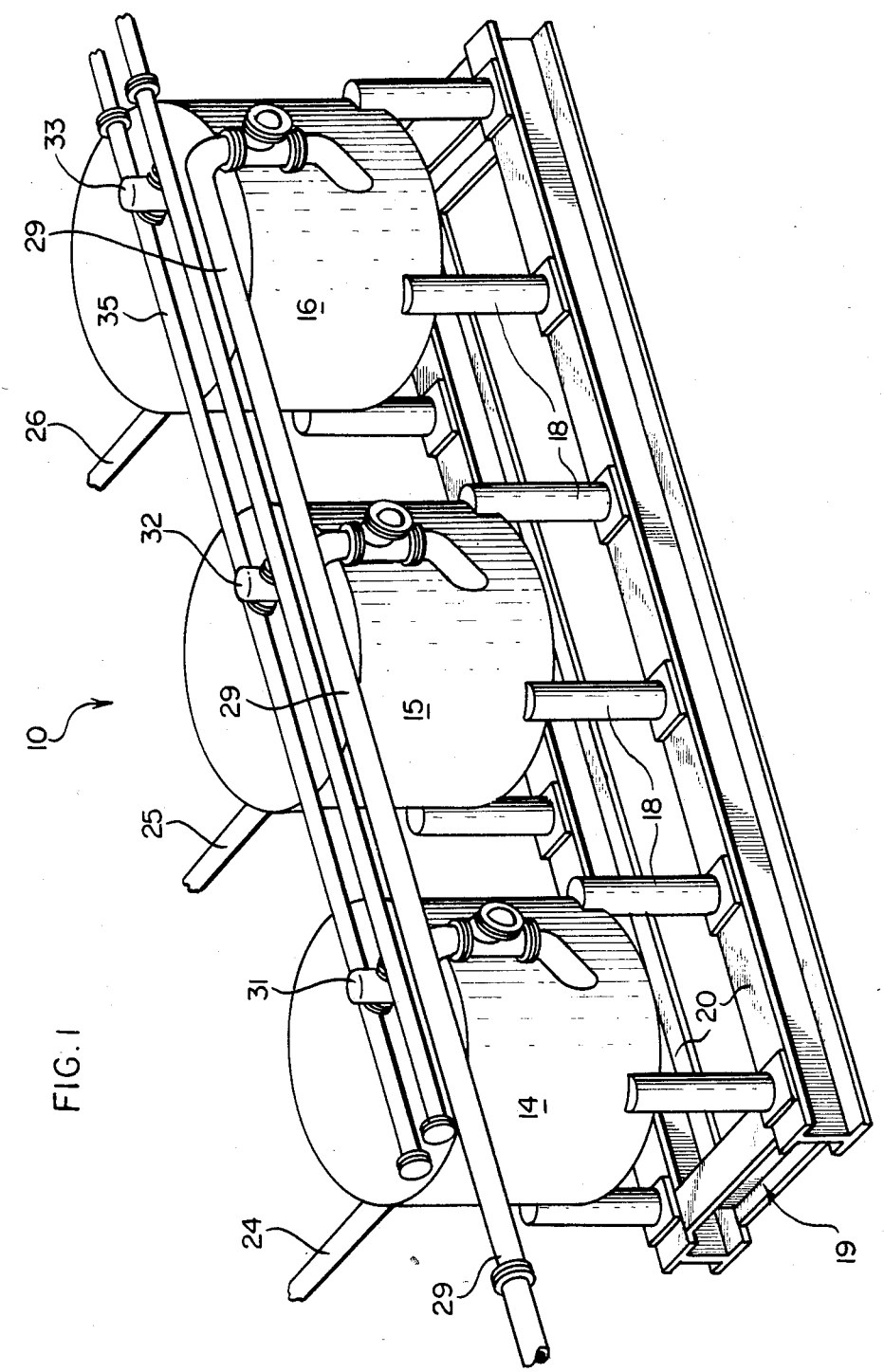

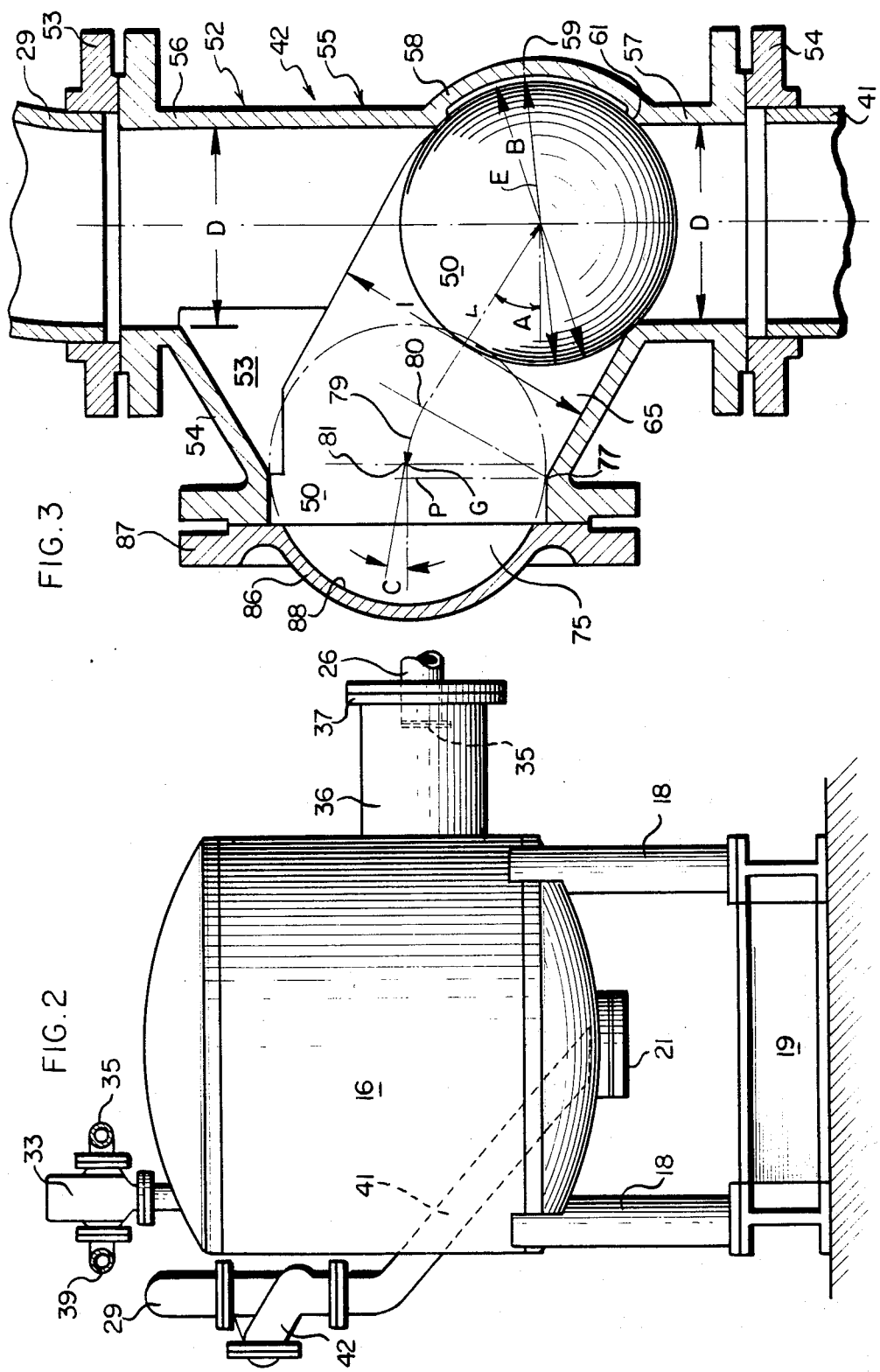

1

BALL-TYPE CHECK VALVE

BACKGROUND OF THE INVENTION

This invention relates generally to check valves, and more particularly concerns a check valve which must perform reliably under severe conditions in a high-capacity pumping device.

Modern industry requires the pumping, or transfer, of a wide variety of slurries or fluidic substances. The fluidic substances can be relatively clear, clean water, or they can include water and a relatively large amount of solid material, more or less suspended in the fluid. Often, large volumes of these materials must be pumped at high pressure. Either the fluids or the carried solids, or both, can be abrasive and/or corrosive in nature.

One high-capacity slurry pumps uses, broadly speaking, several pump vessels or chambers. When pressure in a vessel is reduced, the slurry is drawn in through inlet piping and an inlet check valve. The vessel or chamber is then pressurized, and fluid is discharged through a dip tube and exhaust check valve. After the vessel has been emptied, vessel pressure is reduced, and a subsequent charge of fluidic material is permitted to enter the chamber or vessel through the inlet check valve. One such device is disclosed in co-pending U.S. application Ser. No. 343,165 filed Jan. 27, 1982.

During pump operation, the exhaust check valve must rapidly open to a full-flow-permitting condition, and it must close with an effective fluid-tight seal. Since high pressure and low pressure are rapidly and cyclicly developed within the pump chamber, the check valve opens and shuts with an impact-type action. This severe cycling action, and the hostile fluids which pass through the valve, can damage the valve. When a valve breaks or wears out, it may be necessary to halt pumping action and repair the valve. System down time can be expensive and aggravating to the pumping system operator.

Moreover, the valve must open as completely as possible when an open condition is required, so that fluid can be discharged as easily as possible and with minimized flow resistance from the valve.

Accordingly, it is an object of the present invention to provide a ball-type check valve which can rapidly change from a completely open to a completely closed condition, yet which will not be damaged by the opening and closing action. It is an associated object to provide such a valve which has a trouble-free service life of extended duration.

Another object is to provide such a check valve which will perform satisfactorily even when exposed to high pressure, and which will not quickly wear out when exposed to abrasive or corrosive materials.

An addition object is to provide a ball check valve which permits unobstructed or full fluid flow when the valve is in its open condition, yet which seals effectively in its closed condition, and is relatively silent in operation.

Still another object is to provide a fluid-flow ball check valve which is economical to manufacture.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view of a slurry or fluidic substance transfer apparatus which utilizes the novel outlet or exhaust valve of the present invention;

FIG. 2 is an end elevational view of the apparatus shown in FIG. 1; and

FIG. 3 is a fragmentary elevational view of the novel exhaust valve shown in FIG. 2.

DETAILED DESCRIPTION OF THE PREFERRED EMBODIMENT

While the present invention will be described and claimed in connection with a preferred embodiment, it should be understood that it is not intended to limit the invention to this embodiment. On the contrary, it is intended to cover all alternatives, modifications and equivalents as may be included in the spirit and scope of the present invention.

Turning first to FIGS. 1 and 2, there is shown a slurry transfer system or pumping apparatus 10, which here comprises three separate, individual vessels 14, 15, 16 and associated valves and piping. In order that the pump or slurry transfer system can be offered in a relatively portable or unitized package, these vessels 14, 15 and 16 are carried by legs 18 upon a skid device 19 which here includes a number of suitably sized structural beams 20. If desired, each vessel 14–16 can be provided with a hinged clean-out cover or opening 21.

In operation, a slurry or fluidic substance to be pumped is drawn from a common source through inlet pipes 24, 25 and 26 to each of the tanks 14, 15 and 16. If desired, the inlet pipes 24–26 can be connected in a Y-type arrangement to a single inlet or suction line (not shown). Pressurized slurry is forced out each tank and along a discharge line 29. If desired, a vacuum can be created in each of these tanks 14, 15 and 16 by appropriately opening a three-way valve 31, 32 or 33 so as to encourage the entry of slurry. To create this vacuum, air within each tank is drawn through the associated valve 31—33 via the vacuum or vent header 35.

More specifically, the operation of the pumping apparatus and novel outlet check valve can be understood by considering the operation of an individual chamber 16. It will be understood that the operation of the other tanks or chambers 14 and 15 is similar to the operation of the tank or chamber 16. To encourage even slurry intake and discharge, however, the tanks are operated or cycled in a time-staggered sequence.

As can be envisioned particularly from FIG. 2, when a partial vacuum or reduced pressure is experienced within the vessel 16, a fluidic substance or slurry is encouraged to flow from the intake pipe means 26 past a check valve 35, preferably of the flap type, through an associated housing 36, and into the main tank or vessel interior 16. This housing 36 is connected by a flange or other suitable arrangement 37 to the inlet pipe 26, and opens directly into the tank 16. Fluid flow into the tank 16 continues until a preselected level is reached, or until a predetermined fluid ingress or inflow time period has elapsed.

Thereafter, the three-way valve 33 is arranged to halt withdrawal of air or creation of vacuum within the chamber 16. Then compressed air is admitted into the chamber 16 through the valve 33 from the compressed air header or line 39. This pressurization of the vessel 16 forces the fluidic substance or slurry up a dip tube 41, out of the vessel 16, past the novel outlet check valve 42, and along the slurry discharge header or line 29. This slurry discharge line 29 is, of course, routed to a desired slurry discharge point. When the slurry has been discharged from the vessel 16, admission of air into the tank is halted by the three-way valve 33, and the vacuum is once again drawn within the tank through the vacuum/vent header 35 and three-way valve 33. Actuation of the valve 33 can be carried out on a timed basis, or one or more probes can be provided in the tank 16 to sense when the tank has been filled or emptied, and the valve 33 operated accordingly, as more fully explained in U.S. Pat. No. 4,307,525.

To permit the slurry to flow from the tank 16 into the discharge pipe 29, yet to prohibit the flow of slurry from the pipe 29 back into the tank 16, a novel ball-type check valve 42 is provided. Here, as illustrated in FIG. 2, the check valve 42 is located just outside the tank 16 to maximize ease of repair or maintenance, should either one become necessary.

As can be envisioned from the foregoing explanation, this novel check valve 42 must move rapidly and repeatedly between a fully closed condition in which a spherical element or ball 50 is located in the position shown in solid lines in FIG. 3, and an open position in which the spherical element or ball 50 is located in the position shown in dotted lines. Despite this repeated and relatively rapid cycling action, the valve must not be damaged by the opening and closing action, nor by the abrasive or corrosive nature of the materials flowing through the valve 42 and system 10. In accordance with this aspect of the invention, then, the check valve 42 includes a spherical element or ball 50 carried for movable action within a housing 52. This housing 52 can be made of cast iron or the like, and can be connected by flange structures 53 and 54 to an extension of the dip tube 41 and to the discharge tube 29

In accordance with one aspect of the invention, operation of the valve should not be unnecessarily noisy, and the valve should provide good sealing action in its closed configuration. To accomplish this, the ball 50 is formed of a urethane polymer.

In accordance with another aspect of the invention, the ball valve can move quickly from a fully closed position to a fully open position, in which the ball 50 presents little or no physical obstruction to the flow of fluid from the dip tube 41 through the valve housing 52 and into the discharge pipe 29. To this end, the housing can be considered to comprise a first, vertically disposed cylindrical section 55 as shown in FIG. 3. A hollow top element 56 has an interior diameter D smaller than the diameter B of the spherical element or ball 50. A hollow bottom element 57 has an internal diameter D which is also smaller than the diameter B of the ball element; here, the internal diameters of the top element 56 and bottom element 57 are identical. It will be understood, however, that should fluid flow considerations so require, the internal diameters of these top and bottom elements could differ. In accordance with conventional practice, the housing 52 can be formed by casting a suitable steel. And in accordance with accepted casting practice, interior areas 53 can be recessed from housing edges 54 to reduce casting weight, to decrease cost, and to minimize the production of faulty castings during production.

A mediate element 58 has an inner diameter E which is larger than the diameter B of the spherical element 50. Here, as illustrated, this mediate element 58 is formed by a curved or rounded portion 59. Together, this mediate portion 58 and the bottom portion 59 define a circular seat 61 adapted to engage the spherical element 50 with a fluid-flow-inhibiting sealing action. This housing seat 61 is a continuous, circular band of contact essentially describing a circular, concave, truncated spherical surface geometry. When the spherical element 50 engages the seal 61 in fluid-flow-inhibiting contact, return of fluid from the discharge pipe 29 to the dip tue 41 is inhibited or entirely prohibited. Together, the bottom element 57, mediate element 59 and top element 55 define a generally upwardly extending path of fluid flow through which relatively high volumes of slurry can be discharged at virtually any pressure when the spherical element is moved to the position indicated in dotted lines in FIG. 3.

A second hollow housing section 65 communicates with the first housing section 55. This second section here has an interior shaped in the form of a cylinder, and the cylinder has an interior diameter I sufficiently large to permit free passage of the spherical element 50. This section 65 extends diagonally upwardly and outwardly from the first section at a first angle of inclination A from the horizontal. When the slurry or fluid is caused to flow upwardly through the first section 55, the spherical element 50 is pushed out of the first section 55 and diagonally outwardly and upwardly within the second cylindrical section 65. The section 65 has an effective length L sufficiently to permit the spherical element 50 to move substantially entirely out of the first section 55, into the phantom-line position shown in FIG. 3, so that the spherical element presents almost no physical obstruction to fluid flow up through the first section 55 when the valve is open.

A third valve housing section 75 communicates with and intersects the second section 65 for receiving the ball 50. Here, in accordance with the invention, the second and third sections together define a pivot line 77. This pivot line 77 is oriented so that, after the ball 50 has been caused to move out of the first section by the upwardly flowing fluid and to be positioned at the pivot line 77, a center of gravity G of the ball 50 is caused to move along a bi-ended arcuate path 70 so as to move the ball into an unstable rest position as indicated in FIG. 3. At a first end 80 of the arcuate path, a first force must be supplied by the upwardly moving fluid to counteract the tendency of the ball 50 to roll back down into the first cylindrical section. At a second end 81 of the arcuate path, a second force is required to counteract the tendency of the spherical element to roll down into the first cylindrical section. In accordance with the invention, this second force is less than the first force, and so the ball is carried in an unstable rest position. When fluid flow stops and force is removed from the ball, the ball will roll back down the second section and into its sealing position. Thus, it can be envisioned that the angle of inclination C of the ball 50 at its upper rest position is less than the angle A. By this arrangement, the spherical element 50 is held in its rest position with a fluid pressure or force less than the fluid pressure or force required to remove the spherical element from the first housing element 55 and up the section 65. Moreover, the center of gravity G of the ball 50 is located forward of the vertical extent P of the pivot line 77, so as to encourage the spherical element 50 to roll or move down the second section 65 when fluid pressure on the spherical element 50 is removed.

In the illustrated embodiment, the third valve section 75 is defined at a distal end by a restraining plate or flange 86. This flange 86 is provided with a flange plate or ring 87 adapted to connect, as by bolts (not shown) to other portions of the valve body. The flange 86 also has an inner surface geometry 88 which substantially matches the surface geometry of the ball element 50. When the plate 86 is removed, the ball 50 can be extracted for repair or replacement, and the valve body interior is made accessible for repair or cleaning. It will be noted that valve manufacturing expense can be minimized by forming the valve body as a one-piece casting.

The invention is claimed as follows:

1. A check valve, comprising a spherical element, and a housing adapted to permit undirectional flow of a fluid through the housing and to contain the spherical element, the housing comprising a first vertically disposed cylindrical section including at least one top end element having a diameter which is less than the spherical element diameter, the first section defining a seat for mating with the spherical element in fluid-flow inhibiting contact, the housing further comprising a second cylindrical section having substantially straight sides and a diameter which is greater than the spherical element diameter and communicating with the first section, the second cylindrical section being inclined to the first cylindrical section and adapted such that when a fluid is caused to flow upward through the first cylindrical section, the spherical element is caused to move out of the first cylindrical section and diagonally upward within the second cylindrical section, a third valve housing section communicating with and intersecting the second section for receiving the spherical element, the second and third sections together defining an abrupt pivot line, the pivot line oriented such that after the spherical element has been caused to move out of the first section by the upwardly flowing fluid and to be positioned at the pivot line, a center of gravity of the spherical element is caused to move along a bi-ended arcuate path, a first end of the arcuate path requiring a first force to be supplied by the upwardly moving fluid to the spherical element to counteract the tendency of the spherical element to roll down into the first cylindrical section, a second end of the arcuate path requiring a second force, less than the first force, to counteract the tendency of the spherical element to roll down into the first cylindrical section, the spherical element having a center of gravity, the center of gravity being located forward of said pivot line even when the spherical element is urged to the extremity of its travel, whereby to encourage the spherical element to travel down said second section when fluid pressure on the spherical element is removed.

2. The check valve described in claim 1, including a restraining plate removably carried by said third housing section, the restraining plate making contact with a surface of said spherical element when said spherical element has moved to an upward end of its travel.

3. The check valve described in claim 2, wherein said restraining plate has an inner surface geometry which substantially matches a surface geometry on said spherical element.

4. The check valve described in claim 1, wherein at least said first and second housing sections are formed as an integral casting.

5. The check valve described in claim 1, wherein said spherical element is formed of urethane polymer.

6. The check valve described in claim 1, wherein said fluid-sealing-surface is a continuous, circular band of contact essentially describing a concave truncated spherical surface geometry.

7. In combination, a vessel adapted to withstand a highly pressurized first environment and a second environment where pressure is greatly reduced from the first environment; delivery pipe means functionally connected to the vessel and adapted to carry fluid from the vessel; and a check valve functionally connected to and interposed between the delivery pipe means and the vessel; the check valve comprising a spherical element, and a housing adapted to permit undirectional flow of a fluid through the housing and to contain the spherical element, the housing comprising a first vertically disposed cylindrical section including at least one top end element having a diameter which is less than the spherical element diameter, the first section defining a seat for mating with the spherical element in fluid-flow inhibiting contact, the housing further comprising a second cylindrical section having substantially straight sides and a diameter which is greater than the spherical element diameter and communicating with the first section, the second cylindrical section being inclined to the first cylindrical section and adapted such that when a fluid is caused to flow upward through the first cylindrical section, the spherical element is caused to move out of the first cylindrical section and diagonally upward within the second cylindrical section, a third valve housing section communicating with and intersecting the second section for receiving the spherical element, the second and third sections together defining an abrupt pivot line, the pivot line oriented such that after the spherical element has been caused to move out of the first section by the upwardly flowing fluid and to be positioned at the pivot line, a center of gravity of the spherical element is caused to move along a bi-ended arcuate path, a first end of the arcuate path requiring a first force to be supplied by the upwardly moving fluid to the spherical element to counteract the tendency of the spherical element to roll down into the first cylindrical section, a second end of the arcuate path requiring a second force, less than the first force, to counteract the tendency of the spherical element to roll down into the first cylindrical section.

8. The combination of claim 7 wherein said check valve 10 is located outside said vessel.

9. A check valve, comprising a spherical element of given diameter, and a housing adapted to contain the spherical element, the housing comprising a first vertically disposed generally cylindrical section including a hollow top element having an interior diameter smaller than the spherical element diameter, a hollow bottom element having an interior diameter smaller than the spherical element, a mediate element having a hollow diameter larger than the spherical element, the mediate element and bottom element defining, at their intersection, a circular seat adapted to engage the spherical element with a fluid-flow-inhibiting sealing action, the top, mediate and bottom elements together defining a generally upwardly extending path of fluid flow when the spherical element is not seated on the circular seat, the housing further including a second hollow section having substantially straight sides and an interior sufficiently large to permit passage of the spherical element, the second section communicating with the first section mediate element and extending diagonally upwardly and outwardly therefrom at a first constant angle of inclination, a third hollow section having an interior sufficiently large to permit acceptance of the spherical element, the third section communicating with the second section and extending diagonally upwardly and outwardly therefrom at a second angle of inclination, the second angle of inclination being less than the first angle of inclination to permit the spherical element to be held in and on the third section with a fluid pressure less than the fluid pressure required to remove the spherical element from the first section mediate element and to move the spherical element up the second section, the spherical element having a center of gravity, and wherein said thrid valve body section having an axial length of insufficient magnitude to permit the spherical element to move entirely out of the second section and into the third section even when the spherical element is urged to the extremity of its travel, whereby to encourage the spherical element to travel down said second section when fluid pressure on the spherical element is removed.

10. A check valve according to claim 9, wherein said second valve section has a diagonal length sufficient to permit the spherical element to move entirely out of the first section, whereby to permit uninterrupted, unimpeded fluid flow up the valve first section.

11. A check valve according to claim 9, wherein said third section is defined at a distal end by a removable flange plate.

* * * * *